G. M. RICE.
PROCESS OF TREATING COMPLEX ORES CONTAINING ZINC AND OTHER VOLATILIZABLE METALS FOR THE PRODUCTION OF OXIDS.
APPLICATION FILED JULY 25, 1907.
899,322.
Patented Sept. 22, 1908.
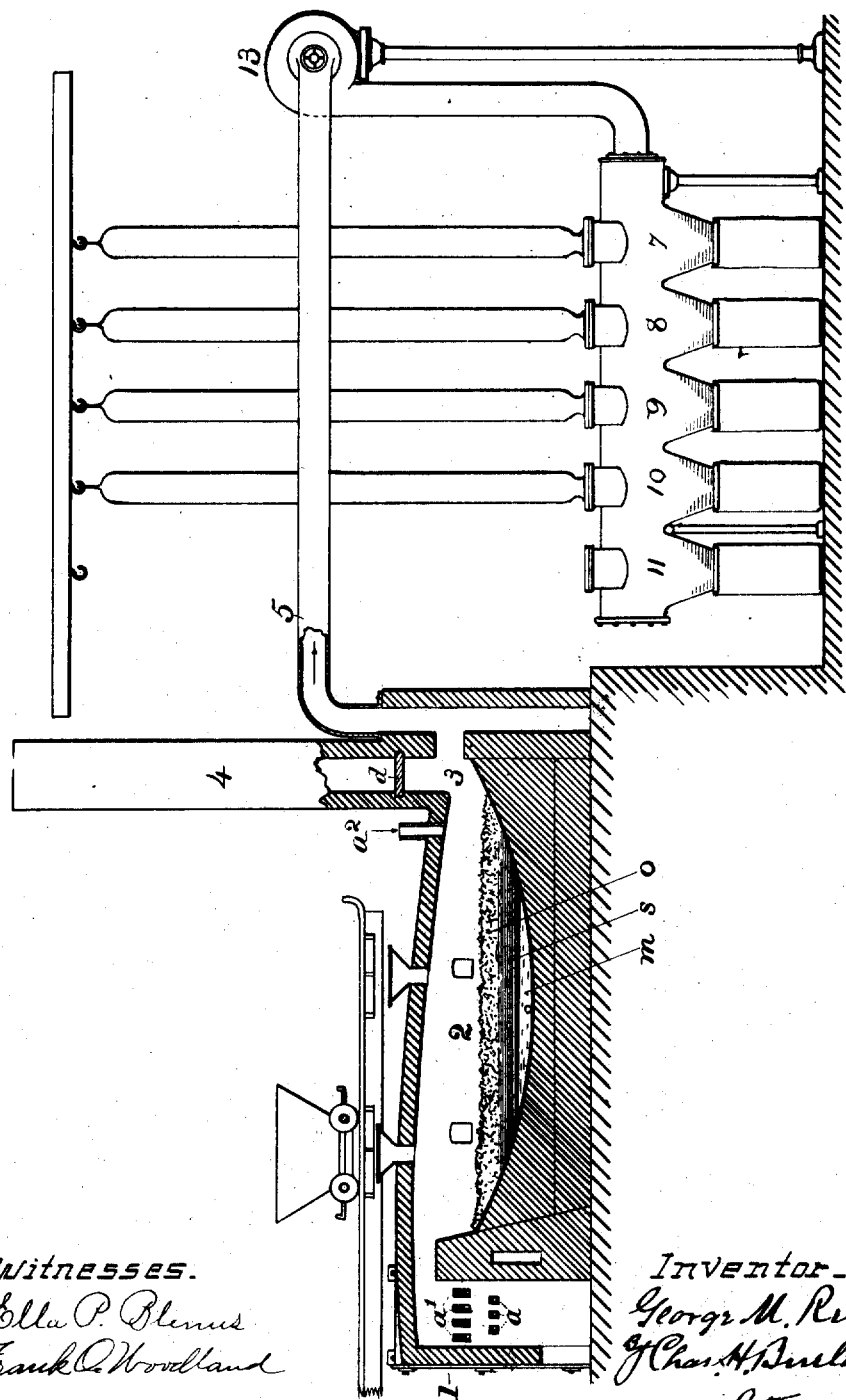

UNITED STATES PATENT OFFICE.

GEORGE M. RICE, OF WORCESTER, MASSACHUSETTS.

PROCESS OF TREATING COMPLEX ORES CONTAINING ZINC AND OTHER VOLATILIZABLE METALS FOR THE PRODUCTION OF OXIDS.

No. 899,322.  Specification of Letters Patent.  Patented Sept. 22, 1908.

Application filed July 25, 1907. Serial No. 385,435.

*To all whom it may concern:*

Be it known that I, GEORGE M. RICE, a citizen of the United States, residing at Worcester, in the county of Worcester and State of Massachusetts, have invented a new and useful Process of Treating Complex Ores Containing Zinc and Other Volatilizable Metals for the Production of Oxids, of which the following is a specification, reference being made therein to the accompanying drawings.

The object of my present invention is to afford a practically efficient method for extracting volatile metals in the form of oxids, from sulfid ores, taken in their raw state and without a previous roasting or other preliminary oxidizing process; such, for instance, as zinc ore or other ores containing metals of a volatilizable nature that form oxids when their vapors or fumes are brought into contact, at high temperature, with atmospheric air.

Another object is to provide a method of treating complex, or other zinc ores to produce oxids, and recovering the non-volatilizable metals and the sulfur, in the form of matte produced in the operation.

The ores to be submitted to my process may be any complex mixture, as for instance ore carrying the sulfids of zinc, cadmium, iron, lead, copper, gold, silver, or other metals in greater or less amounts. The volatilizable metals contained in such ores can be successfully volatilized out and oxidized by the process, while the non-volatile metals, as well as the sulfur contained in the ore mixture, are concentrated in a matte for further utilization.

In carrying out my present process, raw ores crushed to about twenty mesh, more or less, or finer if desired, are mixed with finely divided metallic iron, as for instance the drillings or chips produced by iron working machines of various kinds. The quantity of iron mixed with the ore must be in large excess of the quantity necessary to chemically combine with the sulfur from the volatilizable metals in forming mono-sulfid of iron, (FeS,) and also an additional amount sufficient to saturate and form a slag with what silica the ore may contain; say for complex ores carrying forty parts zinc, about fifty per cent. of their weight of added iron is necessary to easily reduce and volatilize the zinc, and other metals of like nature. It may be more or less in quantity in case of different ores, as may be found necessary to decompose the ore mixture and liberate the metals; but in all cases the added iron must chemically overbalance, or be in large excess of the requirements of the sulfur and silica. Such large per cent. of excess iron has been found to completely free the volatile metals so that they will not be carried into the matte, in part, and thus form a troublesome mixture for after treatment.

The iron employed may be ordinary machine shop waste, chips and filings, borings and turnings; the material known as "iron sponge" comminuted; or iron in any equivalent granular form. This ore and iron mixture is treated in a furnace, a crucible, or a closed retort, of any suitable form, capable of being heated; as by a furnace, or by a current of electricity, or by other means. The retort is connected with a collecting apparatus, which may be constructed as hereinafter described.

The retort or crucible may be closed, except for the leaders to the condenser, and for entrance of the external air, which is allowed to mingle with the metallic vapors given off, as is hereafter explained. After the retort is charged with the ore and iron mixture heat is applied and maintained at such temperature as may be necessary to liberate the metal, or metals, capable of being volatilized out of the ore; and the heating continued until they are driven off and the non-volatile metals have melted and united in the matte that is formed by union of the added iron and the sulfur present in the ore; which product, together with the slag, is then in condition to be discharged from the furnace or retort while still in a fused condition.

It will be understood that no carbon or reducing agent, other than the iron, is required; nor is anything added to the ore mixture for the liberation of the volatile metals while undergoing the process, the iron chips or drillings acting both as a decomposing and as a reducing agent to free such metals.

In some instances silica, or lime, may be added to the mixture to form a slag; or slag from a previous operation may be added when a slag is deemed necessary to facilitate the working of some particular ores; but in most cases it is unnecessary to add slag forming material other than those already present in the ore.

The crucible can be provided with proper openings for entrance of the materials and discharge of the products, and the process thus made continuous.

When treating complex ores containing both zinc and lead, the zinc vapor given off at high temperature unites with the oxygen of the air admitted or forced into the furnace, crucible or retort, thereby forming zinc oxid; while the lead that is vaporized under like circumstances and at the same time, unites with a portion of the sulfur compounds, also given off, forming lead sulfate, thus producing a mixed compound of zinc-oxid and lead-sulfate, which is gathered in suitable manner, and may be in various ways utilized in the arts.

The metallic fumes given off by the ore mixture undergoing treatment, as above specified, are caused to mingle with atmospheric air, as they pass from the retort or furnace, which air may be preheated, if desired, and the oxids produced led away to a bag-house or other gatherer for collection, care being taken to keep out dust and other external matters which might injure the product.

For working my improved process on a large scale, when the object is to produce crude oxids for paint material, or other purposes, a reverberatory smelting furnace may be employed, and the crushed raw zinc ore intimately mixed with iron chips or particles, in the proportions approximately as above stated, is charged onto the hearth of the furnace and there heated and maintained at proper temperature by a gas flame, or other efficient means, while the metallic vapors are given off from the ore, and these vapors from the ore are oxidized by atmospheric air admitted to the furnace to mingle with the vapors; the oxids thus produced being gathered and condensed substantially as above described. The slag can be skimmed off or removed, and the matte tapped and drawn out of the furnace as required. By this method I am enabled to effect, with practical economy, the recovery of the volatile metals in the form of oxids and the production of a residual matte, thus getting all the values direct from raw ore and at a single operation, and without the necessity of preliminary roasting, or any intermediary operations other than the treatment as specified.

The accompanying drawing represents a sectional elevation diagram illustrating, in a general way, the order of arrangement of one form of apparatus which may be used in carrying out my process.

In said drawing the numeral 1 represents the crucible, retort or furnace, within which the mass of mixed ore is treated.

The numeral 2 indicates the melting and vaporizing chamber which may be heated by admitting gas and air through ports $a$ and $a^1$, if preferred; or by electrical currents, or in any suitable manner.

3 indicates the exit-way from the furnace, 4 the chimney or stack having a shut-off device $d$ for closing its flue; 5 indicates the leader for conducting the volatilized metals or vapors to the condensing and collecting chambers or receptacles, which latter are indicated by the numerals 7, 8, 9 and 10; and 13 indicates a power-driven blower or means for inducing the flow of metallic vapors or fumes towards the collecting apparatus.

As herein illustrated, $o$ indicates the ore mass, $s$ the slag, and $m$ the matte, disposed in the furnace as when a charge is partially treated. The furnace is provided with suitable outlets for drawing off or removing the slag and the matte when required.

In practicing my invention an apparatus of this form, or of any other preferred suitable form can be employed; since my invention relates to the process or mode of treatment irrespective of any particular form of apparatus that may be used for working the same.

With the furnace last above mentioned, in the heating up of the ore to the point of volatilization of the metals, a non-oxidizing flame is preferably employed, and above that point an oxidizing flame or atmosphere is necessarily used.

By the within described process of treating volatile metals, it is possible to utilize ores in their natural condition, and by this means to produce their metallic oxids in a more simple manner than the ordinary processes; furthermore, the gain is direct and more complete, avoiding the residual and other losses of the older processes. The yield approximates closely to that found by assay; and further it wholly avoids the roasting process hitherto necessary as a preliminary step in the treatment of such ores.

It will be understood that pure sulfur bearing ores of any volatile metal can be very readily treated in the manner indicated, and the metallic oxids realized from them in much less time than is required by former processes.

In my process the non-volatile metals contained in the ores, such as copper, lead, gold, silver etc., are concentrated in the matte in a condition for any further treatment desired.

I do not claim broadly the employment of metallic iron in the art of metallurgy irrespective of the manner in which it is employed; but my invention has reference to the use of it in the production of metallic oxids in the particular process and manner indicated, and as stated in my specification.

What I claim and desire to secure by Letters Patent, is—

1. The process of producing zinc oxid from sulfid zinc ores, which consists in mixing with the crushed raw ore, finely divided particles or chips of metallic iron in quantity sufficient to overbalance the sulfur requirements, and also sufficient to form a slag with the silica contained in the ore, charging such mixed ore and iron particles into a melting furnace and subjecting the same to heat, thereby vaporizing the volatile metals and melting the matte and slag residuals, oxidizing the metallic vapors as they pass off from the charge, and then condensing and collecting the oxidized product.

2. The process of treating raw sulfid zinc ores, which consists in mixing with the crushed raw ore, chips of metallic-iron in quantity sufficient to overbalance the sulfur requirements, and also to form slag with the contained silica, charging such mixed ore and iron chips into a crucible, or furnace, and then subjecting the same to heat and thereby vaporizing the volatile metals and melting the matte and slag residuals, oxidizing the metallic vapors as they pass off from the charge, then condensing and collecting the oxidized product, and subsequently removing the slag and drawing out the matte, from the furnace or crucible, as separate products.

3. The improvement in treating complex zinc ores, which consists in adding to crushed raw zinc ore a quantity of finely divided metallic-iron chips, such quantity being in excess of the amount necessary to combine with and take up the sulfur in the volatilizable metals in forming FeS., subjecting the mixture to heat in a suitable retort or furnace at a degree sufficient to vaporize and drive off volatilizable metals and melt the residual material to matte and slag admitting air to the vapors or fumes of the volatilized metals for oxidizing the same, and then condensing and collecting the zinc-oxid in suitable chambers.

4. The improvement in the art of producing zinc oxid and other products direct from raw complex, or mixed ores containing zinc, lead, etc, which consists in intimately mixing with the raw crushed ores a quantity of comminuted metallic-iron in an amount that will chemically overbalance the sulfur liberated from the volatilizable metals in forming iron mono-sulfid (FeS.) and also an amount to form slag with the silica contained in the ore, placing the mass in a suitable furnace or retort and therein vaporizing the volatilizable metals and melting the non-volatilizable materials by the application of sufficient heat, and simultaneously admitting air to the vaporized metals for oxidizing the zinc and oxidizable metals, in vaporized condition, then condensing and collecting the vaporized products, and subsequently removing the slag and matte from the furnace or retort as separate products.

5. The process of treating mixed or complex sulfid ores, containing zinc and lead, to produce mixed oxid and sulfate; which consists in mixing with raw crushed ores of the class named, a quantity of metallic iron largely in excess of the amount required to combine with the sulfur liberated from the ore, to form iron mono-sulfid, (FeS.) heating and maintaining the ore and iron mixture at a temperature sufficient to volatilize the zinc and lead, and simultaneously oxidizing the zinc and sulfatizing the lead, while in a vaporized condition, as it is volatilized out of the mass.

Witness my hand this 22nd day of July, 1907.

GEO. M. RICE.

Witnesses:
R. D. ARNOLD,
ELLA P. BLENUE.